United States Patent
Cholod et al.

(10) Patent No.: US 6,428,872 B1
(45) Date of Patent: Aug. 6, 2002

(54) PREPARATION OF A RECORDING CARRIER

(75) Inventors: Michael Stefan Cholod, Bensalem; Donald Richard Hone, Wrightstown; David Henry Stone, Fairless Hills, all of PA (US)

(73) Assignee: ATOFINA, Puteaux (FR)

( * ) Notice: Subject to any disclaimer, the term of this patent is extended or adjusted under 35 U.S.C. 154(b) by 0 days.

(21) Appl. No.: 09/485,435

(22) PCT Filed: Dec. 11, 1998

(86) PCT No.: PCT/US98/26388

§ 371 (c)(1),
(2), (4) Date: Apr. 21, 2000

(87) PCT Pub. No.: WO99/65671

PCT Pub. Date: Dec. 23, 1999

(30) Foreign Application Priority Data

Jun. 15, 1998 (EP) .................................. PCT/EP98/03582

(51) Int. Cl.⁷ .................................................. B32B 3/02
(52) U.S. Cl. ...................... 428/64.1; 428/64.4; 428/457
(58) Field of Search ............................. 428/64.1, 64.2, 428/64.4, 457, 913; 430/270.11, 495.1, 945

(56) References Cited

U.S. PATENT DOCUMENTS

| | | |
|---|---|---|
| 5,080,945 A | 1/1992 | Moriwaki et al. |
| 5,510,408 A | 4/1996 | Fuchigami et al. |
| 5,549,941 A | 8/1996 | Banyay et al. |

FOREIGN PATENT DOCUMENTS

| | | |
|---|---|---|
| EP | 0008543 A1 | 8/1979 |
| EP | 0218256 A2 | 10/1986 |
| EP | 0463382 A2 | 5/1991 |
| EP | 0781808 A2 | 12/1996 |
| GB | 2276634 A | 1/1994 |
| JP | H8-132496 | 11/1994 |
| JP | H9-48827 | 8/1995 |

Primary Examiner—Elizabeth Evans
(74) Attorney, Agent, or Firm—Gilbert W. Rudman

(57) ABSTRACT

Disclosed is a molded disc useful in optical information recording carriers, the disc is comprised of a copolymer of methyl methacrylate and ethyl acrylate, wherein the copolymer is comprised of 97 to 99.9 wt. % of methyl methacrylate and 0.1 to 3 weight % ethyl acrylate, has a molecular weight in the range of from 90,000 to 115,000, has a Tg of from 105° C. to 115.

4 Claims, No Drawings

PREPARATION OF A RECORDING CARRIER

BACKGROUND OF THE INVENTION

1. Field of the Invention

This invention relates to optical information recording carriers. In particular, this invention relates to two-sided optical information carriers, also known as digital video discs, of certain acrylic polymers.

2. Description of the Prior Art

Polymers have become the medium for embedding information as optical information recording carriers. Polycarbonate has dominated the compact disc market, while acrylic polymers, based on polymers of methyl methacrylate, have dominated the laser-readable video disc market.

Two-sided optical information carriers (also called digital video discs, digital versatile discs, "DVD", "DVD-ROM", "DVD-RAM" or "DVD-R") hold much more information than compact discs. Compact discs are based on a single molded disc having a metal facing on one surface, while the final DVD assemblage is two-sided (two discs). As DVDs hold much more information than compact discs, DVDs require precise copying of the pit depths and dimensions of the master facing mold during molding of the individual discs.

In order to produce DVDs on which information can be encoded and read with a low error rate, a number of variables must be controlled. The purity of the starting molding resin must be carefully controlled as impurities can affect reading of the encoded data. The molding resin must be able to flow sufficiently in order to properly fill the mold. The molding resin must be able to precisely replicate the pit depths and dimensions with minimal deformation around the pit. A molding resin that does not precisely replicate the pit depths and dimensions will have increased error in reading the encoded data.

Birefringence of the molded disc must be minimized for high-quality discs and can be controlled by avoiding molded-in stresses in the disc. Birefringence is a measure of optical retardation due to small non-uniformities in disc composition resulting in small, but important differences in the index of refraction. These small non-uniformities are often due to polymer orientation which occurs as a result of the injection molding operation. Birefringence values differing from zero by more than 100 nm are unacceptable. Birefringence leads to a loss of signal intensity, and therefore increased error in reading the encoded data.

Birefringence is a problem with polycarbonate discs because polycarbonate's high stress optical coefficient and stiff flow make it difficult to mold discs with low birefringence values. The low stress optical coefficient and easy flow of acrylic polymers generally result in significantly less birefringence, and offer better replication of the master facing mold.

Discs made from acrylic polymers are less rugged than those made from polycarbonate and are prone to breakage and warpage. A solution to the breakage and warpage problem is to increase the molecular weight of the acrylic polymer used. However, as the molecular weight of the acrylic polymer increases, its flowability decreases. A decrease in the polymer's flowability decreases the polymer's ability to properly fill the mold and, therefore, to precisely copy the pit depths and dimensions of the master facing mold. This results in a disc that has a higher error rate in reading the encoded data.

Japanese unexamined Patent Application 08-132,496 A discloses a method for molding optical discs with specific control of melt and mold temperatures and control of mold pressure in a two-step operation. Their application does not disclose the specific compositions and molecular weights of the acrylic polymers used, except to list a broad list of monomer combinations, and to list a preferred molecular weight range for a copolymer with no more than 80% of polymerized units of methyl methacrylate, and an exemplification of a methyl methacrylate copolymer with 10 weight percent methyl acrylate. The glass transition temperatures of the polymers disclosed in this application will be less than 100° C. Such glass transition temperatures are not high enough to provide an acrylic polymer that sufficiently resists warpage. This application implies that the composition and molecular weight are less important than the specific molding conditions.

Japanese Patent 85-045,649 B2 (Arakawa et al.) discloses an optical information recording carrier, containing a copolymer of methyl methacrylate and ethyl acrylate having a specific composition and intrinsic viscosity. The polymers disclosed in Arakawa et al. have an intrinsic viscosity within the range of greater than or equal to 0.4 dl/g and less than or equal to 0.62 dl/g, as defined by the formula $0.4 \leq y \leq (1/45)x+0.334$, where "y" is the intrinsic viscosity and "x" is the weight percent of ethyl acrylate in the copolymer. As long as the copolymer meets the above criteria for intrinsic viscosity the weight percent of ethyl acrylate in the copolymer can vary from 3 to 13. Arakawa et al. suggest that an acrylic polymer having an intrinsic viscosity more than value defined by the formula $(1/45)x+0.334$ cannot be used as an optical information recording carrier; thus, Arakawa teaches that when x is 3%, then y (intrinsic viscosity) cannot not be more than 0.40 dl/g which would result in a molecular weight maximum of 80,000.

Japanese patent application 09-48827 A (Ohtani et al.) discloses methyl methacrylate copolymers having 3–10%, preferably 4–8%, by weight of a C1 to C8 alkyl acrylate. The only copolymer of MMA/EA exemplified has 4% EA. Ohtani et al. does not disclose that any copolymer any having less than 4% by weight ethyl acrylate can be used as an optical information recording carrier.

There is, therefore, a continuing need to develop acrylic polymers useful in double-sided optical information carriers that resist breakage and warpage, still have sufficient flowability such that they precisely replicate pit depths and dimensions in the master facing mold and can be molded in a very short mold cycle time.

STATEMENT OF THE INVENTION

The present invention is directed to an optical information recording carrier as a component of a digital video disc, the optical information recording carrier comprising a copolymer of methyl methacrylate with no more than 3% wt of a copolymerized ethyl acrylate, the molecular weight of the copolymer being in the range of from 90,000 to 115,000, the copolymer having a Tg in the range of from 105° C. to 115° C.

DETAILED DESCRIPTION OF THE INVENTION

The following terms shall have the following meanings, unless the context clearly indicates otherwise.

The term "molecular weight" means "weight average molecular weight," abbreviated "MW." Molecular weight is estimated by conventional gel permeation chromatographic methods, using poly(methyl methacrylate) standards for calibration.

"Lower alkyl" means linear or branched C1–C4 alkyl, such as methyl, ethyl, n-propyl, iso-propyl, n-butyl and iso-butyl.

"Tilt" is a measurement of flatness made on the assembled two-sided optical information carrier by determining the angular deviation of an incident light beam. Considered acceptable for the optical information recording carrier of the present invention are tilt values of less than 0.8° in the radial direction and of less than 0.30° in the tangential direction after exposing the carrier to 60° C. and 50% relative humidity for 96 hours.

The term "polymer" and "copolymer" are used interchangeably, and the former term encompasses the latter term.

As used herein, the term "acrylic" polymer means a polymer derived from acrylate or methacrylate monomers, or both, such as methyl acrylate, methyl methacrylate, ethyl acrylate and butyl acrylate.

All amounts are percent by weight ("% wt"), unless otherwise noted, and all % wt ranges are inclusive.

As used herein, the following abbreviations are applied: Tg=glass transition temperature; "nm"=nanometer; "mm"= millimeter; "dl"=deciliter; "g"=gram; "MMA"=methyl methacrylate; "EA"=ethyl acrylate; and "AFM"=atomic force microscopy.

Birefringence is measured in terms of the phase shift between the x and y components of light through 0.6 mm thick parts and is expressed in nanometers.

The polymers useful in this invention have a sufficiently high molecular weight and Tg such that the resulting injection molded discs are resistant to breakage and warpage. The acrylic polymer composition is a copolymer of methyl methacrylate and ethyl acrylate.

The amount of the ethyl acrylate is up to 3% by weight based on the total weight of monomers. Preferably the copolymer is comprised of 97 to 99.9 wt % of methyl methacrylate and 0.1 to 3 weight % ethyl acrylate. Especially preferred acrylic polymers are 99.6% wt MMA/0.4% wt EA copolymer and 97% wt MMA/3% wt EA copolymer.

The molecular weight of the copolymer is in the range of from 90,000 to 115,000.

The acrylic polymers useful in this invention have a range of Tg generally from 105° C. to 115° C.

In general, the acrylic copolymer is a random copolymer. The acrylic polymers of this invention and their preparation is known in the art. For example, see U.S. Pat. No. 5,549,941 (Banyay et al).

The discs of the present invention are prepared by an injection molding process, which includes the process known as injection-compression molding. The discs are prepared by an operation wherein the mold having an insert containing encoded information, also known as the stamper, is filled with the molten resin, and then the mold is compressed prior to ejection of the cooled molded article. This process is known to offer advantages in obtaining strain-free parts, thus the discs produced by this process have less birefringence.

The shape, depth and spacing of the pits and grooves molded into the discs are important in the amount and quality of information to be contained on the disc and read by the laser. Well defined pits of the proper depth are important in reducing the errors in reading as compared to shallower pits. Methods such as electron microscopy and atomic force measurements can be used to determine the depth of pits, and the extent of "flatness" near a pit. The "tilt" relates to the extent of error due to angular deviations in the reflected laser beam due to distortion in the flatness of the disc. A high tilt value is deleterious to good signal detection and can cause vibration during disc rotation. High values are usually caused by stresses within the molded discs, therefore, lower tilt values are desirable.

Discs prepared from the acrylic polymers of the present invention not only resist breakage and warpage, but also have low tilt values. The acrylic polymers of the present invention, because of their molecular weight and Tg's, require processing conditions which provide sufficient flowability in order for the acrylic polymers to precisely replicate the pit depths and dimensions of the master facing disc. These processing conditions can be achieved without decomposition of the acrylic polymer. When the acrylic polymer decomposes, the resulting injection molded discs contain bubbles, charring and discoloration, which render the disc useless as an optical information recording carrier.

A barrel injection temperature of at least 270° C. is necessary for the acrylic polymer of the invention to have sufficient flowability. A barrel injection temperature of from 280° C. to 330° C. is preferred. It is preferred that the mold temperature be from 55° C. to –75° C.

The mold cycle time is the time the injected molten resin remains in the mold. The process for preparing injection molded discs utilizes a mold cycle time of 6 seconds or less. Longer mold cycle times may be used, but at increased costs in manufacture.

In a preferred aspect of the above process, the molding time cycle includes a mold fill time of less than 0.1 second. In a separately preferred process, the molding process is injection-compression molding, and the mold is filled through a diaphragm gate so that polymer is distributed radially to all areas of the mold.

It is preferred that the injection molded disc be from 0.3 mm to 1.2 mm in thickness. Especially preferred is an injection molded disc having a thickness of 0.6 mm.

The acrylic polymers of this invention can be molded into discs that have birefringence values less than 10 nm. It is preferred that the injection molded disc exhibit birefringence values less than 50 nm.

The disc resulting from the above process may be converted into an appropriate optical information recording carrier by known processes. Two-sided discs are typically assembled by coating a first molded disc with a metal, such as by sputtering; and adhering a second molded disc to the first disc with an adhesive. Optionally, the first molded disc, after being coated with a metal and before being combined with a second disc, may then receive a protective coating, such as lacquer. Suitable metals include, but are not limited to: aluminum, aluminum alloys and gold. Suitable adhesives include, but are not limited to: hot melt, heat-curable and radiation curable.

Optical information recording carriers according to this invention are useful in any application where a two-sided disc can be used. Suitable applications include, but are not limited to: DVDs, optical storage computer discs (DVD-ROM) and music storage discs.

The following examples are intended to illustrate further various aspects of the present invention, but are not intended to limit the scope of the invention in any aspect.

The acrylic copolymers used in the following Examples were prepared according to U.S. Pat. No. 5,549,941, Example 1A ('941), except that the ratios of MMA/EA were changed and the molecular weight was controlled to yield the compositions shown in Table 1. For optical uses, extreme care was taken in the cleanliness of the raw materials and equipment, including appropriate filtration devices where needed.

The compositions of the copolymer are described by conventional nomenclature, such as 97 MMA/3 EA, where the number represents the % wt of the stated monomer from which the copolymer was derived, such as 97% wt of methyl methacrylate; the "/" merely separates the descriptive terms.

EXAMPLE 1

By following the procedure in '941, the following polymers were prepared.

| Sample | MMA/EA | MW | Tg(° C.) |
|--------|--------|--------|----------|
| A | 94/6 | 95,000 | 100 |
| B | 99.6/0.4 | 95,000 | 115 |
| C | 97/3 | 95,000 | 108 |

Samples B and C are copolymers within the scope of the present invention while Sample A is not.

EXAMPLE 2

Single sided discs were prepared by injection-compression molding the composition of Sample A (94 MMA/6 EA), Sample B (99.6 MMA/0.4 EA) and Sample C (97MMA/3 EA) from Example 1 on a Nissei injection molding machine. In each case cycle time was 5.4 seconds, fill time was 0.073 seconds and the mold temperature was 71° C. Injection barrel temperatures for the materials are listed in the table below.

The single-sided discs were aluminized and bonded, using a UV cured adhesive, to form double sided discs. The double sided discs were then exposed to conditions of elevated temperature and humidity (see table) for 96 hours. After exposure the discs were allowed to acclimatize at ambient conditions. The tilt was measured on a dr. schenk PROmeteus model MT-136. Maximum values of changes in tilt, as measured in the radial and tangential directions, are listed in the table.

After exposure at 55° C. and 50% relative humidity, all three samples show values of tilt in both the radial and tangential directions that are within the range needed for reliable reading of the data from the disks. After exposure at 60° C. and 50% relative humidity, the disc of Sample A show significant distortion in the radial direction relative to discs of Samples B and C. Large values of tilt can lead to the discs being incapable of reliable reading. The large distortion of Sample A due to the exposure conditions can be related to its lower glass transition temperature relative to that of Samples B and C. The lower glass transition temperature of Sample A is due to the higher content of ethyl acrylate.

Maximum Value of Tilt (degrees) After
Environmental Testing for 96 Hours

| Conditions | | Sample A | Sample B | Sample C |
|---|---|---|---|---|
| Maximum Value of Tilt (degrees) After Environmental Testing for 96 hours | | | | |
| 55° C./50% R.H. | radial | 0.55 | 0.48 | 0.42 |
| | tangential | 0.02 | 0.06 | 0.03 |
| 60° C./50% R.H. | radial | 1.20 | 0.70 | 0.80 |
| | tangential | 0.10 | 0.10 | 0.04 |
| Barrel Temperature, | ° C. | 280 | 310–320 | 290–310 |
| | Tg, ° C. | 100 | 115 | 108 |
| | EA, wt. % | 6 | .4 | 3 |

What is claimed is:

1. A molded disc useful in optical information recording carriers, the disc comprised of a copolymer of methyl methacrylate and ethyl acrylate, wherein the copolymer is comprised of 97 to 99.9 wt % of methyl methacrylate and 0.1 to 3 weight % ethyl acrylate, and has a Tg of from 105° C. to 115° C. and the molded disc has a value of changes in tilt, as measured in the radial direction, when measured at 55° C./50% R.H. of less than 0.55 radial and when measured at 60° C./50% R.H. of less than 1.20 radial; wherein the molded disc is coated with a metal and adhered to a second molded disc.

2. The disc of claim 1 wherein the copolymer is 97% wt methyl methylacrylate and 3% wt ethyl acrylate.

3. The disc of claim 1 wherein the copolymer is 99.0 to 99.9% wt methyl methylacrylate and 0.1 to 1.0% wt ethyl acrylate.

4. A two sided digital information carrier comprised of two molded component discs adhered together, wherein each component disc is comprised of a copolymer of methyl methacrylate and ethyl acrylate, wherein the copolymer is comprised of 97 to 99.9% wt of methyl methacrylate and 0.1 to 3% wt ethyl acrylate, and has a Tg of from 105° C. to 115°; and wherein each disc is coated with a metal.

* * * * *